United States Patent Office 2,994,859
Patented Aug. 1, 1961

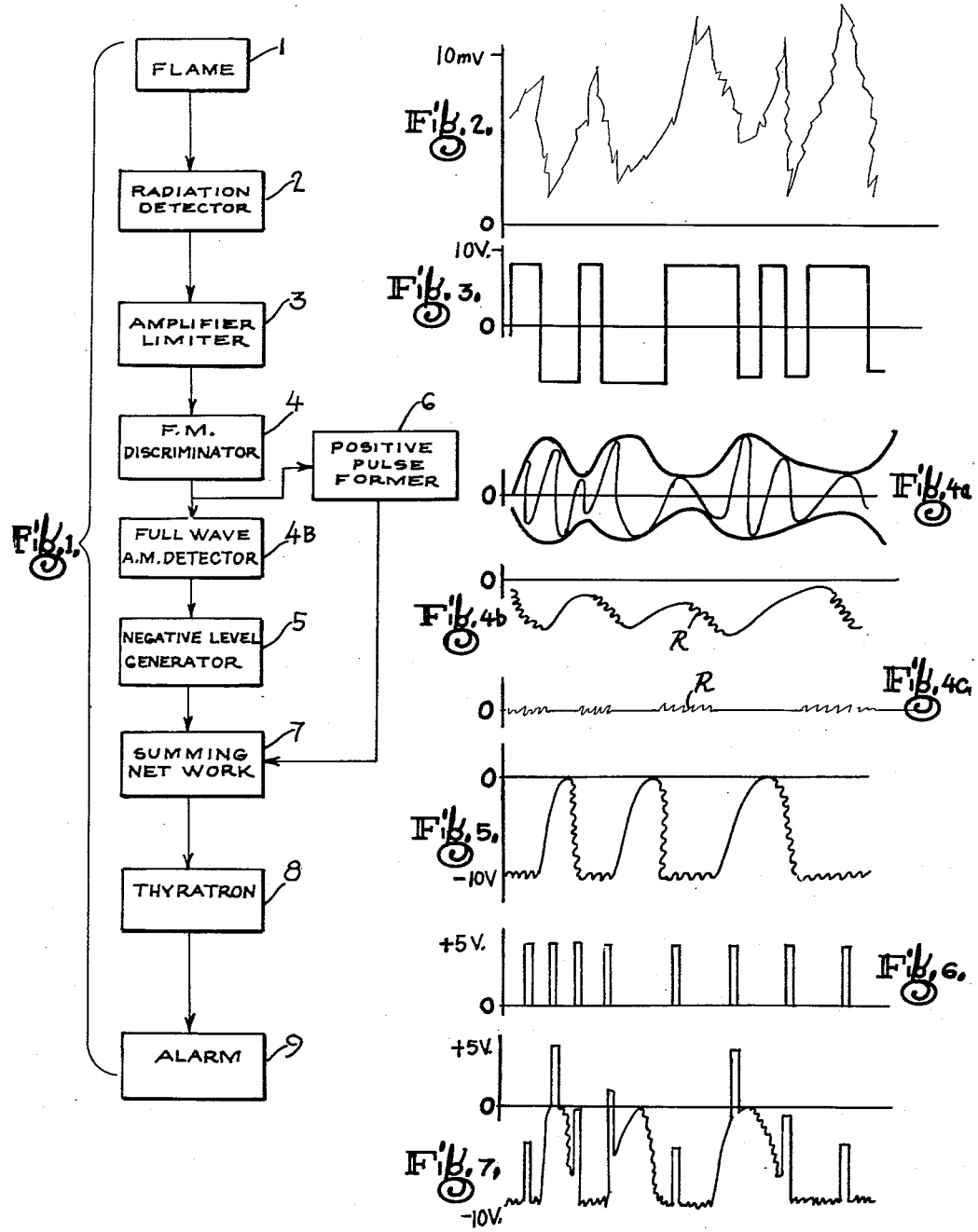

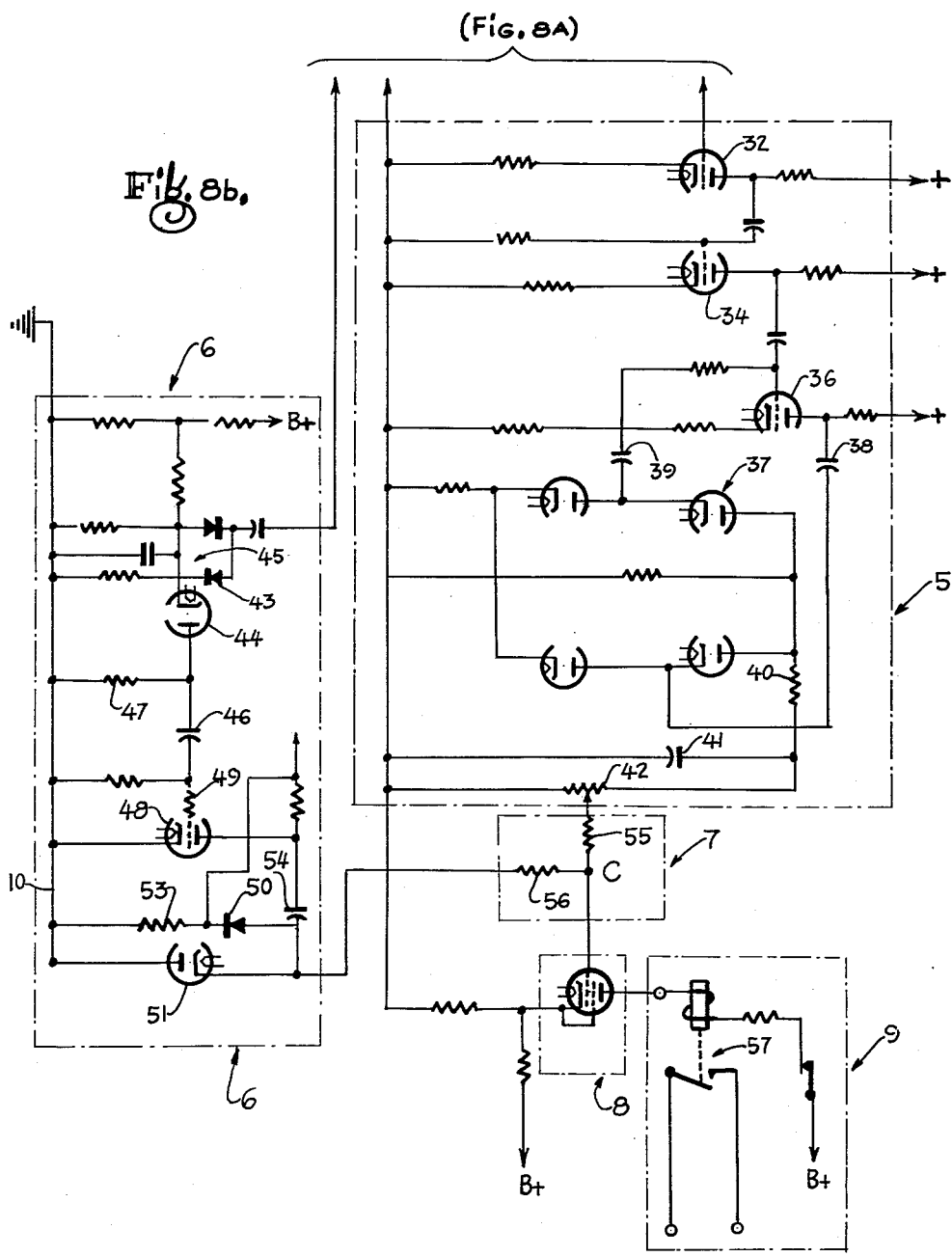

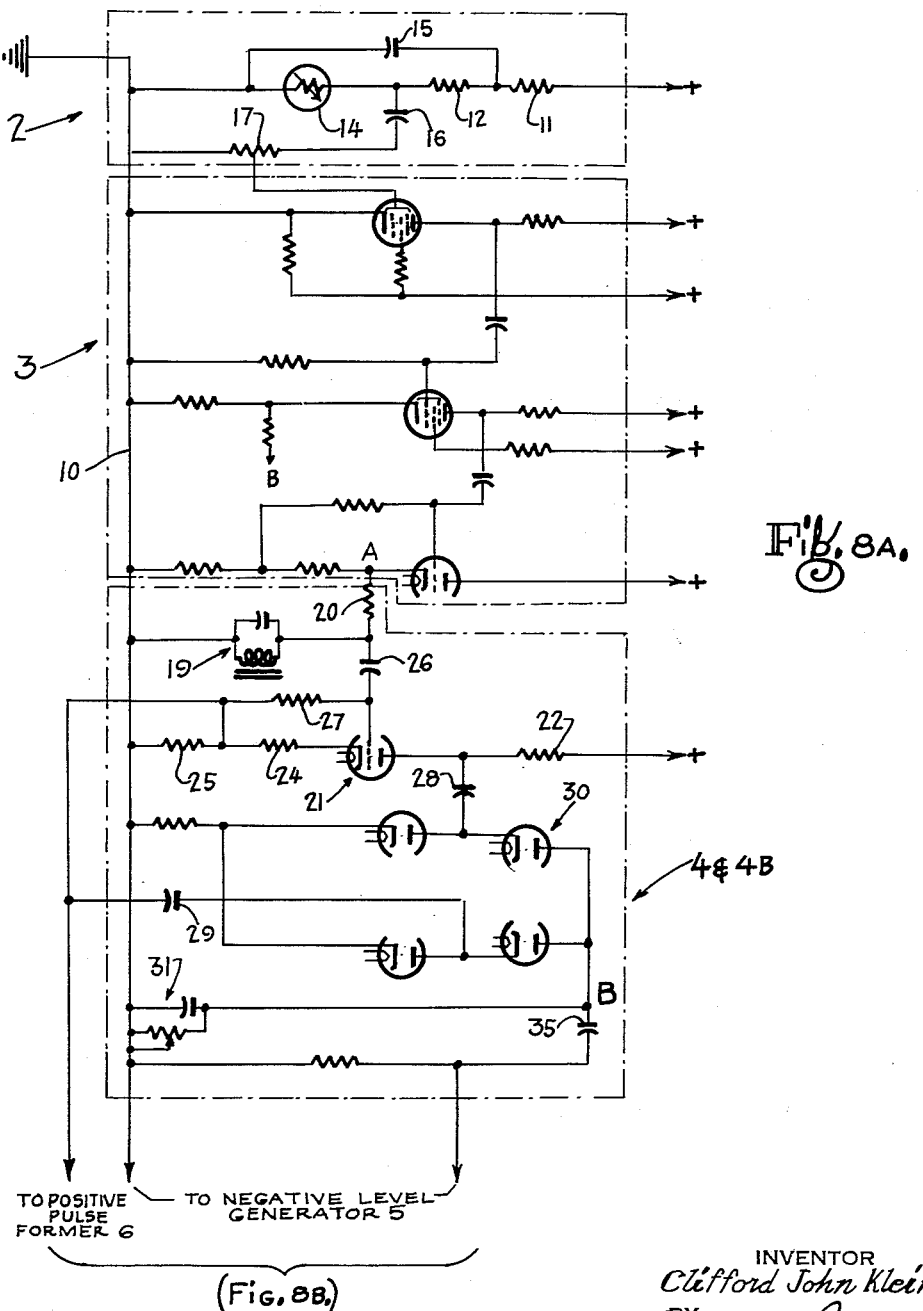

2,994,859
FLAME DETECTING APPARATUS
Clifford John Klein, Riverdale, N.J., assignor to Specialties Development Corporation, Belleville, N.J., a corporation of New Jersey
Filed June 15, 1956, Ser. No. 591,659
4 Claims. (Cl. 340—228)

The present invention relates to detecting flame by sensing the radiant energy thereof, and, more particularly, to an improved circuit for indicating the detection of flame in response to modulated frequencies in the flicker of the flame.

In copending application for Letters Patent of the United States, Serial No. 455,927, filed September 14, 1954, now Patent Number 2,946,990, assigned to the assignee of this application, it has been proposed to utilize the discovery that the frequency at which a flame flickers varies constantly and follows a recognizable pattern comparable to frequency modulation for the purpose of discriminating between flicker and chopped light or radiant energy or the like.

The present invention aims to make use of this modulating frequency phenomenon as a means of flame detection by converting the positive and negative voltage components of the amplitude variations produced in response to detected flame flicker into concurrent output signals of a predetermined character, which when summed, provide a positive output voltage for triggering an electron tube for controlling indicating or alarm means.

Accordingly, an object of the present invention is to provide apparatus which is extremely practical and reliable in discriminating between flame and light from all other sources.

Another object is to provide such apparatus which is extremely sensitive but yet is not subject to false operation.

A further object is to provide such apparatus wherein the signals which are utilized to trigger the electron tube are unique in character.

In accordance with the present invention, the foregoing objects are accomplished by providing flame detector apparatus comprising means for detecting amplitude variations of infrared energy radiated by a flame having an output voltage corresponding substantially to the amplitude variations detected, an amplifier-limiter connected to receive the output of the detecting means to produce an A.C. signal, a modulated frequency discriminator including a network constructed and arranged to convert modulated frequencies from the signal of the amplifier-limiter to an amplitude modulated wave and to produce by full wave detection a substantially constant low level D.C. output voltage combined with ripple pulses of double the input frequency when the voltage of the discriminated modulated frequencies is constant due to substantially steady state input frequency but disappearing when the input frequency changes at a predetermined rate, a negative level generator for receiving the output of the discriminator including a network constructed and arranged to adjust the ripple pulse voltage to a negative value double the input ripple frequency and to cause the D.C. output voltage to closely approach zero or become more positive when the ripple pulses disappear, a positive pulse former connected to received the pulses of the amplitude modulated wave of the discriminator for producing pulses of a substantially constant amplitude within a predetermined band width independent of the output amplitude of the flame detecting means, a summing network connected to receive the output of the negative level generator and the output of the positive pulse former normally having a negative output and producing a positive output when the sum of a positive pulse and the output of the negative level generator is of a positive value, an electron tube connected to be triggered by the output of the summing network when its output is rendered positive, and indicating means under the control of the electron tube.

FIG. 1 is a block diagram illustrating the flame detecting apparatus of the present invention.

FIGS. 2, 3, 4A, 4B, 4C, 5, 6 and 7 are voltage-time graphs illustrating the character of the output signals across various points in the apparatus according to FIG. 1.

FIGS. 8A and 8B are circuit diagrams illustrating the components of the apparatus in detail, these views being so drawn that when laid end to end, from left to right, a complete circuit diagram of the apparatus is provided.

Referring to FIG. 1 of the drawing in detail there is shown, in block diagram style, a source of flame 1, a radiation detector 2 having an output responsive to the frequencies of the infrared radiations of the flame, such as a lead sulphide cell, bolometer, thermocouple or the like, an amplifier-limiter 3, a frequency modulation discriminator 4, a negative level generator 5, a positive pulse former 6, and a network 7 for summing the output of the negative level generator 5 and the output of the positive pulse former 6, which when at a desired positive level triggers an electron tube, such as a thyratron 8 for controlling indicating or alarm means 9 or a fire extinguishing system.

In FIGS. 2, 3, 4A, 4B, 4C, 5, 6 and 7, the voltage signal which appears across various points in the apparatus is plotted against time to illustrate more or less schematically the wave or characteristic of the various signals. The numerals of these views are referenced to the numerals applied to the blocks shown in FIG. 1.

The voltage output of the detector 2 corresponds substantially to the amplitude variations of the flame as it flickers. As seen in FIG. 2, these variations appear as a wave changing in amplitude and frequency.

The amplifier-limiter 3 is connected to receive the output of the detector 2 and produces an amplified A.C. signal within a desired frequency band, substantially as illustrated in FIG. 3.

The frequency modulation discriminator 4 has three distinct functions. First, the modulated frequencies from the signal of the amplifier-limiter 3 are converted to an amplitude modulated wave (FIG. 4A). Second, this wave is full-wave detected (FIG. 4B). Third, a substantially constant low level D.C. output voltage is produced which is combined with ripple pulses R of double the input frequency when the voltage of the discriminated modulated frequencies is constant due to steady state input frequency, as would be the case when the output of the detector is caused by light or other radiant energy which lacks modulated frequencies. The loss of the ripple voltage is a function of slow decay of capacitance voltage in the full-wave detection of the discriminator input signal. This ripple voltage disappears when the input frequency changes at a predetermined rate due to modulated frequency detected in the flame (FIG. 4C).

The negative level generator 5 includes a network constructed and arranged to adjust the ripple pulse voltage to a negative value at double its input frequency as seen in FIG. 5. When the ripple voltage disappears due to modulated frequency detection in the flame, this negative D.C. output voltage becomes more positive and closely approaches zero.

The positive pulse former 6 is connected to receive the negative pulses of the amplitude modulated wave (FIG. 4A) and produces positive pulses (FIG. 6) of a substantially constant amplitude within a predetermined band width independent of the output amplitude of the flame detector 2.

The summing network 7 receives the output of the negative level generator (FIG. 5) and the output of the positive pulse former (FIG. 6) and sums these outputs algebraically, as shown in FIG. 7. For example, if the negative ripple pulses are at minus ten volts and the peaks of the positive pulses are limited to plus 5 volts, the positive pulses are added to the ripple pulses and their peaks appear well below the zero line and have a negative value. However, when the ripple pulses disappear and the negative D.C. level approaches zero (FIG. 5), the summed voltages have a positive value which is indicated by the peaks above zero and is of a value to trigger the thyratron 8, whereby the indicator or alarm 9 is operated.

In the graphs just described, the waves or signal represent a condition of flame detection and illustrate three instances of modulated frequency detection capable of causing an alarm to be rendered or to effect operation of a fire extinguishing system.

In FIGS. 8A and 8B, the circuit diagram illustrates the components and arrangement thereof of each of the blocks shown in FIG. 1 for producing the signals depicted by the graphs just described. In this diagram, lines 10 are shown connected to the ground (or the negative side of a battery or other source of D.C.), and the terminals connected to the positive side are indicated by a plus sign for the purpose of simplicity.

The radiation detector 2 comprises a resistor 11, a resistor 12 and an infrared detector 14, such as a lead sulphide cell or the like, connected in series from positive to negative; a capacitor 15 connected across the resistor 12 and the detector 14; and a capacitor 16 and a potentiometer 17 connected in series from between the resistor 12 and the detector to the line 10.

The amplifier-limiter 3 shown herein is a conventional voltage amplifying network which receives the output of the radiation detector from the top of the potentiometer 17 and produces an amplified A.C. output signal at A within the desired band of frequencies.

The frequency modulation discriminator 4 comprises a resonant circuit 19 connected by a resistor 20 to the output of the amplifier-limiter 3 and the line 10; a tube 21 having its plate connected to the positive through a resistor 22, having its cathode connected to the negative (line 10) through resistors 24 and 25 in series, and having its grid connected to the resonant circuit through a capacitor 26; and a grid leak resistor 27, whereby the output of the tube 21 is of a push-pull nature for the purpose of full wave amplitude detection. The plate output and the cathode output of the tube 21 are respectively connected through capacitors 28 and 29 to the respective halves of full wave detector 30 provided with an adjustable filter 31 which enables the detected amplitude modulation to appear at point B.

The negative level generator 5 includes voltage amplifying tubes 32 and 34 coupled to the detector filter at B through a capacitor 35, a tube 36 arranged like the tube 21 to produce push-pull output, a full wave detector 37 having the plate and cathode outputs of the tube 36 connected to the respective halves thereof through capacitors 38 and 39 a filter including a resistor 40 and capacitor 41, coupled into the full wave detector 37, and a potentiometer 42 for adjusting the negative level.

The positive pulse former 6 comprises an amplitude discriminator 43 including a diode 44 and a time delay network 45 connected to the cathode of the tube 21; a differentiating circuit including a capacitor 46 and a resistor 47 is coupled to the plate output of the amplitude discriminator diode 44; a tube 48 for amplifying the negative grid signal received from the differentiating circuit through a limiting resistor 49; and a clipper limiter including diodes 50 and 51 and resistors 52 and 53 coupled through a capacitor 54 to the plate output of the tube 48.

The summing network 7 comprises a resistor 55 coupled to the output of the negative level generator through the potentiometer 42 and a resistor 56 coupled to the output of the clipper limiter circuit (cathode of diode 51). The resistors 55 and 56 are joined at the terminal C which is in electrical connection with the grid of the thyratron 8.

The thyratron is conventionally connected to a relay 57 which controls an indicating and/or alarm circuit 9, whereby, whenever the sum of the summing network output equals or exceeds the bias developed by resistors 55 and 56 in the thyratron circuit, the thyratron is caused to fire and effect energization of the relay 57.

While the present invention has been described in connection with a flame detector, it will be understood that the system could be utilized for detecting random signals and rejecting repetitious or regular occurring signals. This is accomplished by substituting for the infrared energy detector suitable means for detecting both random and repetitious signals having a voltage output which can be analyzed by the remainder of the network to produce an indication when random signals are detected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A flame detector comprising means for detecting and converting flickering radiations of a flame into an electrical signal having an amplitude which varies when the frequency of the flame radiations vary, means for limiting said signal to a predetermined amplitude, frequency modulation discriminator means for producing a second signal which varies in amplitude in response to variations in the frequency of said first signal, a channel for receiving said second signal and producing an output pulse only when there is a variation in the amplitude of said second signal, a channel for receiving said signal and forming output pulses whenever said second signal is present, and means operative by the output of said channels for giving an indication when pulses of said channels occur simultaneously.

2. A flame detector comprising means for detecting and converting flickering radiations of a flame into an electrical signal of a predetermined amplitude, a channel for receiving the signal and modifying the same to produce an output having a predetermined voltage of one sign which closely approaches zero when there is a variation in the frequency of the detected radiations, a channel for receiving the signal and forming pulses in response thereto having a predetermined voltage of the opposite sign, means for summing the otuputs of said channels and means under the control of said summing means for giving an indication when the sum of the output voltages exceeds a predetermined value.

3. In a system for detecting random signals and rejecting repetitious signals, means for detecting random and repetitive signals having an output voltage, an amplifier-limiter connected to receive the output of said detecting means and produce an A.C. signal, a frequency modulation discriminator including a network constructed and arranged to convert a frequency modulated signal in the output of said amplifier-limiter to an amplitude modulated wave and to produce by full wave detection a substantially constant low level D.C. output voltage combined with ripple pulses of double the input frequency when the voltage of the discriminator output is constant due to substantially steady state input frequency but disappearing when the input frequency changes at a predetermined rate, a negative level generator for receiving the output of said discriminator including a network constructed and arranged to adjust the ripple pulse voltage to a negative value double the input ripple frequency and to cause the D.C. output voltage to closely approach zero when the ripple pulses disappear, a positive pulse former connected to receive the negative pulses of the amplituted modulated wave output of said discriminator for producing pulses of a substantially constant amplitude within a predetermined band width independent of the output amplitude of said first mentioned means, a summing network connected to receive the output of said negative level generator and the output of said positive pulse former normally having a negative output and producing a positive output when the sum of a positive pulse and the output of said negative level generator is of a positive value, an electron tube connected to be triggered by the output of said summing network when its output is rendered positive, and indicating means under the control of said electron tube.

4. In a flame detector, means for detecting amplitude variations of infrared energy radiated by a flame having an output voltage corresponding substantially to the amplitude variations detected, an amplifier-limiter connected to receive the output of said detecting means and produce an A.C. signal, a frequency modulation discriminator including a network constructed and arranged to convert a frequency modulated signal in the output of said amplifier-limiter to an amplitude modulated wave and to produce by full wave detection a substantially constant low level D.C. output voltage combined with ripple pulses of double the input frequency when the voltage of the discriminator output is constant due to substantially steady state input frequency but disappearing when the input frequency changes at a predetermined rate, a negative level generator for receiving the output of said discriminator including a network constructed and arranged to adjust the ripple pulse voltage to a negative value double the input ripple frequency and to cause the D.C. output voltage to closely approach zero when the ripple pulses disappear, a positive pulse former connected to receive the negative pulses of the amplituted modulated wave output of said discriminator for producing pulses of a substantially constant amplitude within a predetermined band width independent of the output amplitude of said first mentioned means, a summing network connected to receive the output of said negative level generator and the output of said positive pulse former normally having a negative output and producing a positive output when the sum of a positive pulse and the output of said negative level generator is of a positive value, an electron tube connected to be triggered by the output of said summing network when its output is rendered positive, and indicating means under the control of said electron tube.

References Cited in the file of this patent

UNITED STATES PATENTS

| | | |
|---|---|---|
| 2,722,677 | Krueger | Nov. 1, 1955 |
| 2,749,447 | Smith | June 5, 1956 |
| 2,749,515 | Hansel | June 5, 1956 |
| 2,804,608 | Carbauh | Aug. 27, 1957 |
| 2,811,711 | Cade | Oct. 29, 1957 |
| 2,820,945 | Marsden | Jan. 21, 1958 |